United States Patent [19]
Robertson

[11] Patent Number: 4,749,534
[45] Date of Patent: Jun. 7, 1988

[54] PROCESS OF MAKING A FILAMENT WOUND COMPOSITE MATERIAL LEAF SPRING

[75] Inventor: Richard E. Robertson, Allen Park, Mich.

[73] Assignee: Ford Motor Company, Dearborn, Mich.

[21] Appl. No.: 797,719

[22] Filed: Nov. 12, 1985

[51] Int. Cl.$^4$ .................. B29C 53/60; B31C 13/00
[52] U.S. Cl. ........................ 264/136; 156/172; 264/137; 264/157; 264/297.8; 267/47; 267/148; 267/149
[58] Field of Search ............... 264/136, 137, 157, 257, 264/297.8; 156/161, 162, 172; 267/47, 148, 149

[56] References Cited

U.S. PATENT DOCUMENTS

| | | |
|---|---|---|
| 2,600,843 | 6/1952 | Bush . |
| 2,829,881 | 4/1958 | Morris . |
| 3,142,598 | 7/1964 | Rosen .................................. 156/162 |
| 3,439,400 | 4/1969 | Brownyer ......................... 267/47 X |
| 3,490,758 | 1/1970 | Foster ................................. 267/47 |
| 3,814,410 | 6/1974 | Fukui et al. ........................... 267/47 |
| 3,900,357 | 8/1975 | Huchette et al. ............... 264/263 X |
| 3,945,625 | 3/1976 | Duchemin ............................ 267/47 |
| 3,966,864 | 6/1976 | Stenzenberger ............... 264/136 X |
| 4,546,958 | 10/1985 | Ohno et al. .......................... 267/47 |
| 4,560,525 | 12/1985 | Ryan .................................... 264/136 |
| 4,659,071 | 4/1987 | Woltron .............................. 267/149 |

Primary Examiner—Jeffery Thurlow
Assistant Examiner—Leo B. Tentoni
Attorney, Agent, or Firm—Peter D. McDermott; Roger L. May

[57] ABSTRACT

A constant cross-sectional area filament wound composite material leaf spring of optimal energy storage efficiency given the constraints of filament winding and maximum spring width comprises a portion which widens toward the end of the spring, the rate of increase of width of the spring being such that the longitudinal side surfaces of the spring along such portions follow a lateral, outwardly convex curve of radius $R_I$, wherein $R_I$ at each point is substantially equal to the camber, i.e., the longitudinal radius of curvature $R_C$ at that point.

3 Claims, 2 Drawing Sheets

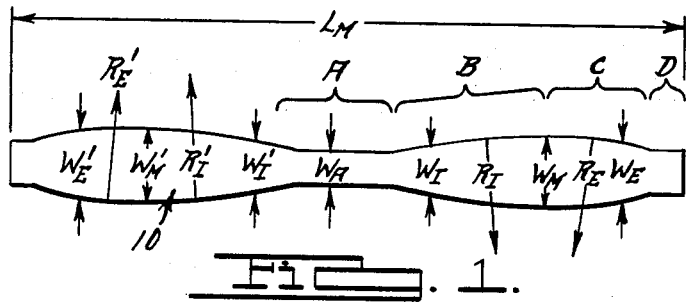
Fig. 1.
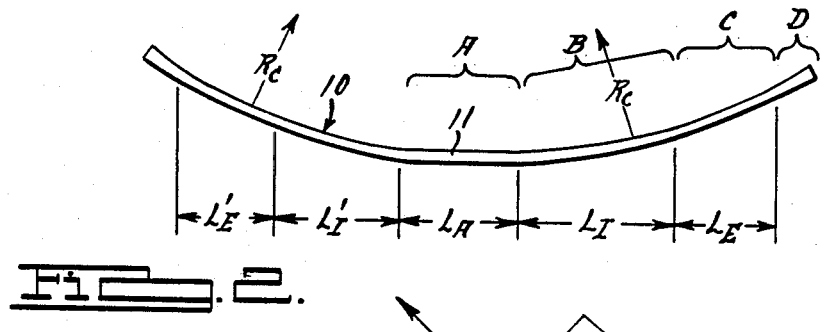
Fig. 2.
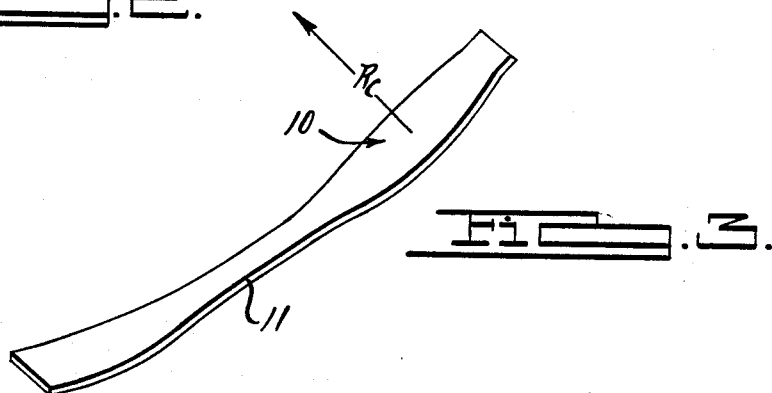
Fig. 3.
Fig. 4.
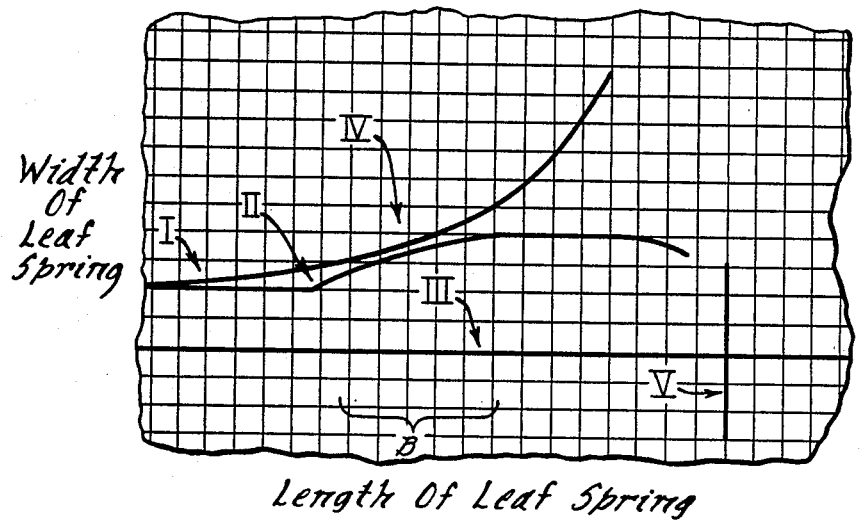
Length Of Leaf Spring

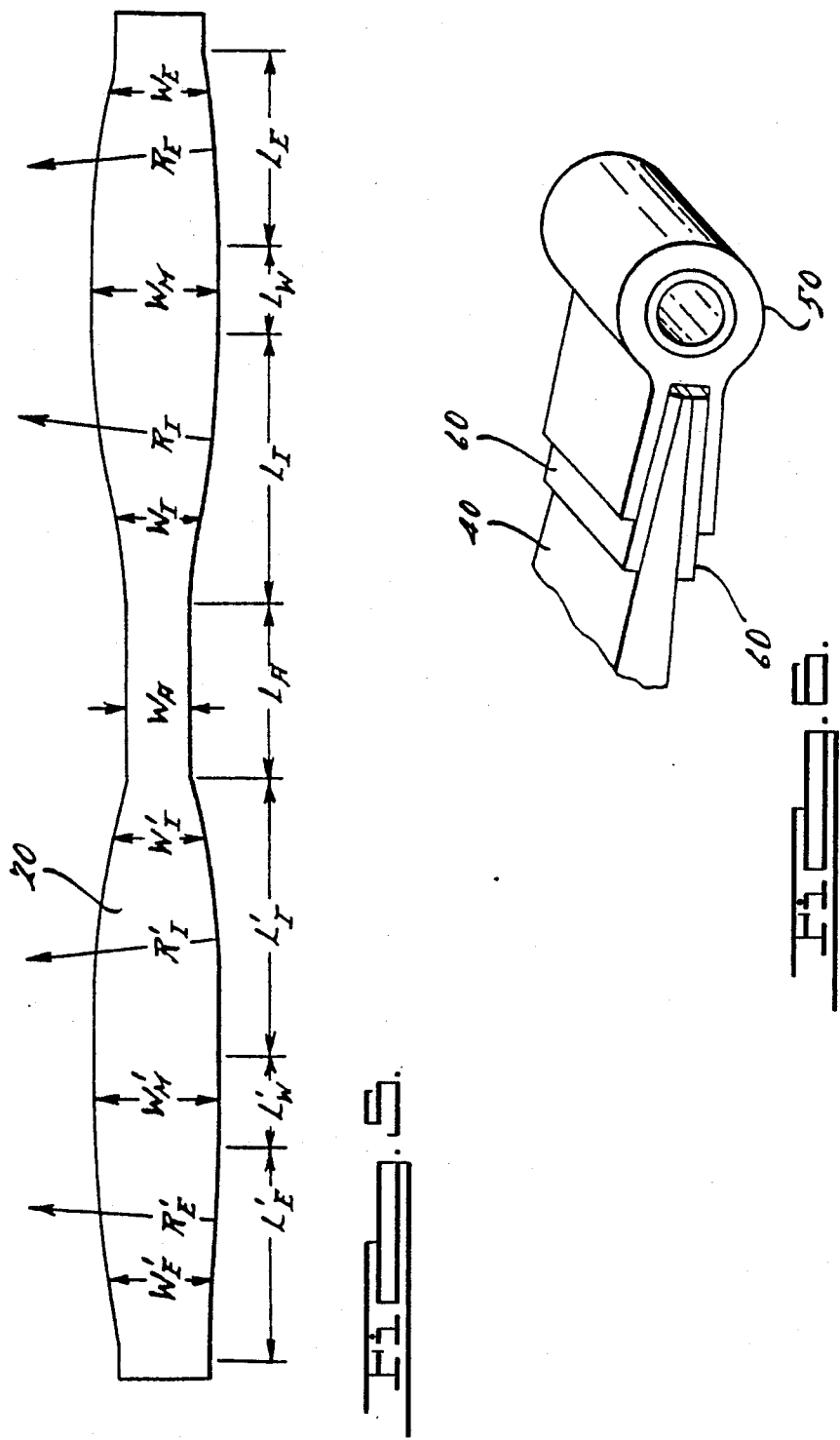

PROCESS OF MAKING A FILAMENT WOUND COMPOSITE MATERIAL LEAF SPRING

This is a division of Application Ser. No. 566,067, filed Dec. 27, 1983, now U.S. Pat. No. 4,575,057.

TECHNICAL FIELD

This invention relates to a filament wound composite material leaf spring suitable for use in a suspension system, for example, an automotive vehicle suspension system. More particularly it relates to a filament wound composite material leaf spring of optimal efficiency. That is, a composite material leaf spring which maximizes the energy storage capability per unit mass of the leaf spring while meeting design and dimension constraints established for the leaf spring by its environment of use and by the limitations and requirements of the filament winding process.

BACKGROUND ART

Composite material leaf springs are known, which springs typically comprise a reinforcing material, for example glass roving or other filamentary solids, in an organic solid such as thermoplastic or thermosetting plastic. Such springs are shown, for example, in U.S. Pat. No. 2,600,843; U.S. Pat. No. 2,829,881; and U.S. Pat. No. 3,142,598. In the past, composite material leaf springs have been used in suspension systems such as, for example, automotive vehicle suspension systems with associated mounting hardware.

Composite material leaf springs are known to provide significant weight savings over comparable metal leaf springs adapted for the same application. The lower weight of the composite material leaf spring is an important advantage in certain application, such as in automotive vehicle suspension systems, where lower vehicle weight translates directly into increased fuel economy. Composite material leaf springs can be manufactured by any of several known methods including filament winding, compression molding, pultrusion, hand lay-up methods or the like or by a hybrid method incorporating some combination of these methods. Filament winding techniques are known to provide several advantages over alternative methods of manufacturing composite material leaf springs. One significant advantage is the lower cost and relative simplicity of filament winding manufacturing techniques. The necessary equipment is well known generally and includes a winding mandrel, a chamber for a resin bath and simple fixtures and devices to guide the filaments through the resin bath, to regulate the amount of resin carried by the filament, to maintain proper tension on the filaments and to orient and guide the filaments onto the winding mandrel. All such production equipment is relatively inexpensive in comparison, for example, to production equipment employed in pultrusion (especially for curved leaf springs). In addition, the filament winding process itself can be less complex than other methods such as pultrusion. Certainly, filament winding provides far greater productivity than hand lay-up techniques.

Filament winding typically involves coating or impregnating glass roving, yarn or the like with a resin composition comprising liquid resin and a suitable curing agent for the resin. The roving can be dipped into the liquid mixture or otherwise brought into contact with it. One or more layers of the impregnated roving is then wound onto a mandrel having a suitable configuration to provide a preform of the desired product. In the case of filament winding a leaf spring, the resin-impregnated filaments can be wound into an annular trough in the radial edge of a wheel-shaped mandrel being rotated on an axle. The preform can then be cured, optionally with application of heat, pressure or both, over a period of time to yield the desired product. Numerous classes of resins suitable for use in filament winding techniques are known to the skilled of the art. These include, for example, epoxy resins, silicone resins, polysulfides, polyurethanes, vinyl ester resins and polyester resins and the like.

Composite material leaf springs have been suggested in a wide variety of shapes and dimensions. Production of leaf springs by a filament winding method presents certain design constraints, most significant of which is that the leaf spring will necessarily have a substantially constant total cross-sectional area. To obtain such constant cross-sectional area leaf springs with suitably low spring rates and better spring efficiency, it is necessary to flare the ends of the leaf spring, that is, to make the ends of the spring wider (width being the dimension of the upper and lower surface of the leaf spring perpendicular to the longitudinal axis of the leaf spring) and less thick (thickness being the dimension of the leaf spring between the upper and lower surfaces, perpendicular to the longitudinal axis of the leaf spring). Typically, the spring is given a narrow, thick cross-section in the central area of the spring, that is, in the axle attachment area of the spring. This is generally necessary in view of the high bending moments experienced by that portion of the spring. To provide a lower spring rate, the cross-sectional shape of the leaf spring is generally made to gradually become wider and less thick toward the end portions of the leaf spring. Less thickness is sufficient in the end portions since the leaf spring experiences smaller bending moments there. The lower spring rate advantageously provides increased flexibility and durability.

Further, while it is known that a certain degree of flare at the end portions of the spring can be provided during the filament winding process, a critical limitation in this regard is the need to maintain tension on the resin-impregnated filaments as they are wound onto the winding mandrel. Filament tautness during the winding process ("tautness" meaning, at least, absence of slack; typically, for example, the filaments as a whole are wound under about 20 lbs. tension) is needed to properly align the filaments to produce springs of adequate strength, durability, etc. However, since the filaments are under such tension and since the filaments after exiting the resin bath are guided to the winding mandrel from a stationery or substantially stationery guide fixture, the filaments cannot be made to follow a severely flared contour in the winding mandrel. It will be apparent that filaments wound into an annular trough having a severely flared contour, that is into a portion of a trough which rapidly widens, would be pulled toward the axial center line of the winding path as the winding mandrel continued to rotate and, hence, would not follow the flared contour. The filaments would become concentrated toward the center of the leaf spring as winding proceeded. Even if the resin flowed sufficiently to fill in the flared contour without filaments, such leaf spring would have significantly reduced strength and durability. For this reason, filament wound leaf springs in the past, unless subjected to secondary shaping steps, have provided little or no flare and, if flared, they have generally provided only substantially straight line flare from the axle attachment portion in the center of the spring to the spring attachment eyes. Of course, even where the leaf spring does have such straight line flare, the maximum width of the flare would necessarily be limited to the maximum permissible width of the eye of the spring. The eye at each end of a filament wound leaf spring generally is relatively narrow (as noted above regarding the central portion of the spring, the axle attachment portion) to provide sufficient thickness and strength, since this portion is used for mounting the leaf spring to the vehicle chassis. Due to such constraints, filament wound leaf springs in the past have provided less than optimal spring efficiency, less than optimal energy storage capability per unit mass of composite material of the leaf spring and, thus, have been more expensive and have weighted more than desirable for many applications.

A composite material leaf spring can be given a flared configuration by compression molding or like step following the filament winding process. Such added process steps, however, are disadvantageous since they involve added expense, time and complexity. In addition, the deformation or dis-alignment of the filaments of the leaf spring by such secondary shaping steps can significantly reduce the strength and durability of the finished spring. Accordingly, there is a recognized need for a filament wound leaf spring which can be fashioned either with or, preferably, without secondary shaping methods. More specifically, there is a need for a filament wound composite material leaf spring which, given any particular maximum length and maximum width design constraints, provides optimal spring efficiency to minimize the weight, size and cost of the spring, that is, a leaf spring having such configuration as to provide optimal spring flexibility consistent with the strength of the composite material and optimal energy storage capability per unit mass of composite material of the spring. In U.S. Pat. No. 3,900,357 a composite material spring is suggested. The composite material spring of this reference, however, is not a filament wound leaf spring. It would not lend itself to be made by a filament winding technique since it is not of constant cross-sectional area. In any event, it is not flared at the end portions and, hence, would not provide a spring or optimal spring efficiency, i.e., it would not provide a spring of the greatest possible percentage of the theoretical energy storage per unit mass of composite material.

Various metal leaf springs for suspension systems, such as automotive vehicular suspension systems, are widely known and used, for example, that of U.S. Pat. No. 3,490,758. A filament wound composite material leaf spring following the configuration of such known metal leaf springs, however, would not provide optimal energy storage capability per unit mass of composite material of the leaf spring. Other known metal leaf springs such as, for example, that shown in U.S. Pat. No. 3,439,400, are not of constant cross-section and, thus, could not be produced using filament winding techniques.

DISCLOSURE OF THE INVENTION

According to a first aspect, the present invention provides a filament wound composite material leaf spring. The leaf spring can provide substantially optimal energy storage capability per unit mass of composite material and can be adapted for use in a suspension system such as an automotive vehicle suspension system. It has substantially parallel upper and lower surfaces of substantially equal length $L_M$ and width $W_M$ at their widest point. The leaf spring has longitudinal camber such that the upper and lower surfaces have radius of curvature $R_C$, where $R_C$ is not necessarily constant over length $L_M$. The leaf spring also has a right and a left longitudinal side surface and a substantially constant total cross-sectional area. According to a characterizing aspect of the invention, the longitudinal side surfaces of the leaf spring, in those portions wherein the width of the leaf spring changes, are outwardly convex and define a curve, the radius of which at each point is equal to the longitudinal radius of curvature $R_C$ of the spring at that point.

According to one embodiment, the filament wound leaf spring of the invention as defined above comprises:

an attachment portion, typically for example a centrally located axle attachment portion, being of length $L_A$ about $(0-0.4)L_M$ and substantially uniform width $W_A$ less than $W_M$;

an outwardly convex intermediate portion of length $L_I$ about $(0.1-0.5)L_M$, integral with and extending longitudinally from the aforesaid central portion, and having width $W_I$ which increases continuously over length $L_I$ from about $W_A$ adjacent the attachment portion to about $W_M$ at its widest point, the rate of increase of the width $W_I$ being such that the longitudinal side surfaces of the leaf spring along this intermediate portion each flare outwardly, that is, each follows a lateral, outwardly convex curve of radius $R_I$, which radius $R_I$ at each point along $L_I$ is substantially equal to the aforesaid longitudinal radius of curvature $R_C$ at that point;

a constant width portion of length $L_W$ about $(0-0.3)L_M$, integral with and extending longitudinally from the aforesaid intermediate portion, and having substantially uniform width of approximately $W_M$; and an end portion of length $L_E$ about $(0.0-0.2)L_M$ integral with and extending longitudinally from the aforesaid constant width portion or, if none, then from the aforesaid intermediate portion, having width $W_E$ which decreases from approximately $W_M$ adjacent said constant width portion or intermediate portion, as the case may be, to a width less than $W_M$, the rate of decrease of the width $W_E$ being such that the longitudinal side surfaces of the leaf spring along this end portion each follows lateral, outwardly convex curve of radius $R_E$, which radius $R_E$ at each point along $L_E$ is substantially equal to the aforesaid longitudinal radius of curvature $R_C$ at that point.

It should be recognized that a leaf spring according to the present invention would provide the aforesaid constant width portion following the aforesaid intermediate portion to achieve the requisite spring rate and energy storage capability in view of a maximum spring width established, for example, by space limitations at the intended spring mounting location. In addition, the aforesaid end portion may be followed by an end-most section of constant width for engagement with suitable attachment hardware.

In most applications and according to preferred embodiments, the filament would leaf spring of the invention would not have a single intermediate portion and end portion but rather would have an intermediate portion and an end portion, as described above, on each side of a central or near central axle attachment portion. These two sides of the leaf spring need not be identical to one another, that is the two ends of the leaf spring need not be symetrical with one another. For use in suspension systems such as automotive vehicle suspension systems, the central portion of the leaf spring typically would be mounted to an axle or other wheel carrying member and the ends of the leaf spring each would be fitted with an attachment eye and appropriate additional hardware for attachment to the vehicle chassis according to well known methods and designs. Of course, a filament wound leaf spring for use in an automotive passenger vehicle must meet relevant governmental regulations and industry specifications including, for example, any regulations and specifications regarding the configuration of the eye and axle attachment portions of the leaf spring.

According to a second aspect of the present invention, a method is provided of making the filament wound composite material leaf spring described above, which method comprises:

A. providing a winding mandrel having a convex winding surface with longitudinal radius of curvature $R_C$, which radius of curvature is not necessarily constant over the length of the winding surface, and having side walls extending radially from the winding surface to form therewith a trough or channel of length at least $L_M$;

a first portion of the trough having length $L_A$ about $(0.0-0.4)L_M$ and substantially uniform width $W_A$ less than $W_M$;

a second portion having length $L_I$ about $(0.1-0.5)L_M$, following the first portion, having width $W_I$ which increases continuously over length $L_I$ from about $W_A$ adjacent the aforesaid first portion to $W_M$ at its widest point, which increase in width is provided by lateral outward curvature of the aforesaid longitudinal side walls, the lateral curvature radius $R_I$ of each side wall at each point along $L_I$ being substantially equal to the longitudinal curvature radius $R_C$ of the winding surface at that point;

a constant width portion of length $L_W$ about $(0-0.3)L_M$, following the second portion and having substantially uniform width of approximately $W_M$; and a fourth portion having length $L_E$ about $(0.0-0.2)L_M$ following the aforesaid constant width portion of the trough, having width $W_E$ which decreases over length $L_E$ from $W_M$ adjacent the constant width portion of the trough to a width less than $W_M$;

B. providing an array of continuous filaments adapted to be wound into the trough;

C. impregnating the array of filaments with molten thermoplastic or, preferably, thermoset plastic liquid resin; and D. winding the array of resin-impregnated filaments, under tension, into the aforesaid trough.

According to a preferred embodiment of the method aspect of the invention, a method is provided of making a filament wound composite material leaf spring of length $L_M$ and maximum width of $W_M$, having substantially parallel upper and lower surfaces and a right and a left longitudinal side surface. The leaf spring has longitudinal camber such that the upper and lower surfaces have longitudinal curvature of radius $R_C$, where $R_C$ is not necessarily constant over length $L_M$. The method according to this preferred embodiment comprises providing an approximately wheel-shaped winding mandrel rotatably mounted on an axle. The mandrel has a peripheral annular trough defined by an approximately annular winding surface and side walls extending radially from the winding surface. The winding surface has longitudinal radius of curvature $R_C$, where $R_C$ is not necessarily constant over the length of the trough. A first portion of length $L_A$ about $(0.0-0.4)L_M$ of the trough has substantially uniform width $W_A$ less than $W_M$. A second portion of length $L_I$ about $(0.1-0.5)L_M$, following the first portion of the trough, has width $W_I$ which increases continuously from about $W_A$ to $W_M$ over length $L_I$. This increase in width is provided by lateral, outwardly convex curvature of the side walls. The lateral curvature radius $R_I$ of each side wall at each point along $L_I$ is substantially equal to the longitudinal curvature radius $R_C$ of the winding surface at that point. A third portion of length $L_W$ about $(0-0.3)L_M$, following the second portion, has substantially constant width $W_M$. A fourth portion of length $L_E$ about $(0.0-0.2)L_M$, following the third portion of the trough, has width $W_E$ which decreases continuously from $W_M$ to less than $W_M$ over length $L_E$. This decrease in width is provided by lateral, outwardly convex curvature of the of the side walls along a curve of radius $R_E$, which radius at each point along $L_E$ is substantially equal to the longitudinal curvature radius $R_C$ of the winding surface at that point. An array is provided of continuous filaments adapted to be wound into the trough around the mandrel. This array of filaments is impregnated with molten thermoplastic or, preferably, thermoset plastic liquid resin composition, of which many are commercially available and well known to the skilled of the art. Finally, the array of resin-impregnated filaments are wound under tension into the annular trough.

According to a more preferred embodiment, the annular trough described immediately above further comprises a fifth portion of length $L'_I$ about $(0.1-0.5)L_M$ immediately following the aforesaid first portion of the trough distal the aforesaid second portion. This fifth portion has width $W'_I$ which increases continuously over length $L'_I$ from $W_A$ adjacent the first portion to $W'_M$, $W'_M$ being not more than $W_M$. A sixth portion of length $L'_W$ about $(0.0-0.3)L_M$, following the aforesaid fifth portion of the trough, has substantially constant width $W'_M$. A seventh portion of length $L'_E$ about $(0-0.2)L_M$ follows the sixth portion and has width $W'_E$ which decreases continuously over length $L'_E$ from $W'_M$ adjacent the sixth portion to less than $W'_M$. The change in width of the leaf spring in the fifth and seventh portions is provided by lateral outwardly convex curvature of the side walls. The radius $R_I$ of such lateral curvature of the side walls at each point is substantially equal to the radius $R_C$ of the longitudinal curvature of the winding surface at that point.

In an even more preferred embodiment of the method aspect of the invention, the method is adapted to provide multiple leaf springs from a single winding mandrel. In this embodiment of the invention, the annular trough defines a series of, for example, three typically identical sets of first, second, third, fourth, fifth, sixth and seventh portions, as described above, wherein each such set forms one leaf spring. It will be understood from the foregoing description that the seventh portion of each set would follow the fourth portion of the preceding set. In this manner, three leaf springs are formed simultaneously in the trough. Typically, they can be cured by application of heat and/or pressure while still in the trough. Following cure, the individual leaf springs are cut or otherwise separated from each other and removed from the winding mandrel.

Although the description of the leaf spring (and of the method) of the invention has indicated that each defined portion of the spring follows or is adjacent to the preceding and following portions of the spring, the skilled of the art will readily recognize that this does not exclude embodiments wherein relatively small transition zones occur intermediate the defined portions. Thus, for example, it is preferred to employ a transition zone between the first portion and second portion (and likewise, between the first and fifth portions) of the leaf spring as defined above. Such transition zones would bridge the flat side surface of the first portion to the outwardly convex side surface of the second portion of the spring. It would embody a longitudinal side surface which is outwardly concave immediately adjacent the first portion and which smoothly becomes outwardly convex and fairs into the outwardly convex surface of the second portion. It will be within the skill of the art in view of the present disclosure to provide suitable transition zones which do not significantly reduce the efficiency of the leaf spring of the present invention. Such transition zones might extend, for example, over a length equal to about 10% of the length of the second portion of the leaf spring. The outwardly concave portion of such transition zone would preferably have the minimum suitable radius, that being a value which can be approximated sufficiently closely by trial and error. The transition zones avoid kinking of the reinforcing filaments and filament wound leaf springs comprising same are within the scope of the present invention.

The present invention provides a significant advance in the art, specifically, a filament wound composite material leaf spring of optimal energy storage capability per unit mass of composite material. That is. it provides a leaf spring adapted for use in a suspension system, such as an automotive vehicle suspension system, which leaf spring is of such configuration as to provide substantially optimal spring efficiency given normal design constraints and the constraints of the filament winding process. Other features and advantages of this invention will become more apparent from the following detailed description thereof, and from the drawings illustrating the preferred embodiment and best mode of the invention.

BRIEF DESCRIPTION OF THE DRAWINGS

FIG. 1 is a plan view of a filament wound composite material leaf spring according to a preferred embodiment of the present invention.

FIG. 2 is a side elevational view of the filament wound composite material leaf spring of FIG. 1.

FIG. 3 is a perspective view of the filament wound composite material leaf spring of FIG. 1.

FIG. 4 is a graph illustrating of a portion of the profile of the leaf spring of FIGS. 1-3 in somewhat simplified form.

FIG. 5 is a plan view of a filament would composite material leaf spring according to another preferred embodiment of the invention.

FIG. 6 is a perspective view, partially broken away, of a leaf spring with an attachment eye thereon.

DETAILED DESCRIPTION OF THE INVENTION

For purposes of illustration and discussion of the present invention, it will be assumed that the filament wound composite material leaf spring of the invention is employed in an automobile suspension system and is substantially symmetrical about a central axle attachment region. As a general principle of leaf spring design, the most efficient configuration for a spring is that wherein the width increase with distance from the axle attachment point according to the general equation (1):

$$b/B = L/(L-x)$$

where B is the width of the spring at the axle seat, b is the width of the spring at distance x from the axle, and L is the length of the spring section from the axle seat to the eye. It will be appreciated, however, that such configuration cannot actually be obtained since it is usually convenient and often a design requirement that the spring be of constant width over the central axle attachment portion of the spring. Also, the spring is necessarily limited to some maximum width, typically about twice the width of the axle attachment portion. Certainly the spring width cannot approach infinity as suggested by the above equation. The present invention provides a novel filament wound leaf spring of low spring rate and optimal spring efficiency, that is, optimal spring flexibility consistant with the strength of the material and optimal energy storage per unit mass of composite material, given design constraints of a certain length and a certain maximum width and the need to maintain filament tautness during the winding process. More specifically, the present invention provides a composite material leaf spring wherein the spring flares from the central axle attachment region to its maximum permissible width at the greatest possible rate without thereby causing substantial filament disalignment within the spring. As noted above, avoidance of filament disalignment within the spring is important to the ultimate strength and durability of the leaf spring.

Referring now to the drawings, FIG. 1 shows a filament wound composite material leaf spring according to a preferred embodiment of the invention. The leaf spring shown is adapted for use in a suspension system and, more particularly, is adapted for use in the suspension system of an automotive vehicle or like application. The leaf spring has longitudinal upper surface 10 and longitudinal lower surface, not shown, each of substantially equal length. The leaf spring has a right longitudinal side surface 11 and a left longitudinal side surface (not shown). For purposes of discussion, the overall length, that is, the longitudinal dimension of the leaf spring, is defined to be $L_M$ and the width, that is, the lateral dimension of the upper surface (shown) and lower surface (not shown) at the widest point, is defined to be $W_M$. The leaf spring comprises a central portion A having length defined to be $L_A$. Preferably length $L_A$ is about $(0-0.4)L_M$ and, typically, is about $0.1L_M$. This central portion has substantially uniform width $W_A$ which is less than $W_M$. The central portion typically is employed as an axle attachment portion. Preferably it has substantially no camber. The leaf spring further comprises an intermediate portion B integral with and extending longitudinally from the aforesaid central portion. The intermediate portion has length $L_I$ which preferably is about $(0.1-0.5)L_M$ and width $W_I$ which increases continuously from the width of the central portion $W_A$ to the maximum width of the leaf spring $W_M$ over its length $L_I$. The width increases with distance from the center of the leaf spring.

The leaf spring has a certain degree of camber, that is, as shown in FIGS. 1, 2 and 3, the leaf spring is curved upward into the plane of the upper longitudinal surface 10. More specifically, the leaf spring has longitudinal camber of radius $R_C$ in the aforesaid upper and lower surfaces, wherein $R_C$ is not necessarily constant over the length of the leaf spring.

According to a characterizing aspect of the invention, the right and left lateral surfaces of the aforesaid intermediate portion B each flares outwardly, that is, each has lateral outward curvature of radius $R_I$, wherein $R_I$ is at each point along $L_I$ substantially equal to $R_C$ at that point. That is, the leaf spring becomes wider along length $L_I$ by lateral outwardly convex curvature of the longitudinal side surfaces and the radius of curvature thereof is substantially equal to the radius $R_C$ of the camber of the leaf spring at each point along $L_I$. Stated another way, the flare or the rate of increase of $W_I$ is such that the longitudinal side surfaces of the leaf spring along such intermediate portion each follows a curve of radius $R_I$, where $R_I$ at each point along $L_I$ is equal or approximately equal to the camber, i.e., the longitudinal radius of curvature $R_C$, at that point of the spring. In similar manner, the lateral side surfaces of the leaf spring in portion C, wherein the leaf spring becomes more narrow, each follows an outwardly convex curve of radius $R_E$, where $R_E$ at each point in portion C is equal or approximately equal to the camber, i.e., the longitudinal radius of curvature $R_C$, at that point along the spring.

The significance of this characterizing aspect of the invention can be best appreciated in conjunction with an explanation of FIG. 4. In FIG. 4, line II provides a somewhat simplified profile of a portion of the longitudinal side surface of a leaf spring according to the invention. Specifically, the profile is shown of the longitudinal side surface of some of aforesaid portion A, all of portion B and some of portion C, as defined in FIGS. 1 and 2. (Although, for simplicity, no transition zone is shown between portions A and B, in practice there would be such a transition zone to prevent kinking of the filaments.) The so-called intermediate portion of the leaf spring is marked as portion B in FIG. 4. Line I depicts the theoretically preferred profile of the leaf spring according to equation (1), above, wherein the width of the leaf spring would increase from width $W_A$ at the axle attachment portion to infinity at the eye of the leaf spring. Line III represents the longitudinal central axis of the leaf spring. Line IV indicates the maximum width of the leaf spring. Typically, this constraint would be established as a matter of design necessity in view of the particular application intended for the given leaf spring. Line V indicates the end of the leaf spring at length $L_M$. It can be seen that the leaf spring begins to widen at the beginning of intermediate portion B. The most flexible spring (given the contraints of a certain length, certain maximum width and a central axle attachment portion) is obtained with the smallest possible radius of curvature of the width change along portion B. That is, the most flexible spring is obtained if the actual profile of the leaf spring is made to approach the theoretical profile of line I as rapidly as possible over intermediate portion B. As noted above, however, in view of the need to maintain tension upon the filaments during the winding process, the filaments cannot be laid down and retained along a contour which laterally widens at an excessive rate. However, it has now been discovered that where the winding surface of the mandrel onto which the resin-wet filaments are being wound has longitudinal, outwardly convex curvature of radius equal to the camber of the leaf spring, the taut filaments will follow such widening lateral contour. That is, it has been discovered that the maximum rate at which a winding trough can be widened is achieved if at all points along the winding path wherein the width changes, the side walls follow an outwardly convex curve whose radius at each point is equal to the radius of the camber defined by the trough at that point.

Essentially, it has been found that by following the above-discussed design limitation, taut, resin-impregnated filaments can be laid down along such laterally widening contour and such filaments will not be pulled inward by the tension on the filaments toward the central longitudinal axis of the winding path, so long as filaments have already been laid down to a substantially equal or greater thickness inward of such new filaments. Accordingly, since a leaf spring of maximum optimal energy storage capability per unit mass of composite material is obtained when the width change of intermediate portion B has the smallest radius of curvature, and recognizing in view of the present disclosure that the radius of lateral outward curvature must be at least as great as the radius of curvature of the camber at each point to produce a leaf spring wherein the filaments remain properly aligned and homogenously distributed during winding, the skilled of the art will understand the critical nature of the foregoing characterising aspect of the present invention, that the radius of curvature of the lateral surfaces at each point along the leaf spring wherein the width is changing, must substantially equal the radius of curvature of the camber at that point.

The third portion of the leaf spring, if any, is a constant width portion. A leaf spring according to the invention might comprise such section due to a maximum width design constraint for the leaf spring established by the physical dimensions of the location in which the spring is to be used. A leaf spring comprising such constant width portion is shown in FIG. 5, discussed below.

The fourth portion of the leaf spring, if any, comprises the end of the leaf spring and in the preferred embodiment illustrated in the drawings comprises two segments. The first segment C is integral with and extends longitudinally from the aforesaid intermediate segment B. The distal portion D according to such preferred embodiment comprises an attachment segment of substantially constant width, adapted for mounting the leaf spring. The end portion comprising segment C has length $L_E$ preferably about (0.0–0.2) $L_M$ and width $W_E$ which decreases continuously over length $L_E$ from $W_M$ to less than $W_M$. As discussed above, the rate at which the width of the end portion decreases must follow the same limitation as the rate at which the width of the intermediate portion B increases. As the channel width decreases the resin-impregnated filaments laid into the channel will build to a greater thickness. Thus, it can be seen in FIGS. 2 and 3 that the thickness of the leaf spring is greatest in the central portion A where the leaf spring is narrowest. The leaf spring is least thick at the boundary between portions B and C where the leaf spring is at its maximum width $W_M$. For increased strength of the attachment eye, portion D is made less wide and more thick.

While only one half of the leaf spring of FIGS. 1–3 has been described in detail above, it will be apparent to the skilled of the art that the other half of the leaf spring, whether symmetrical to the first or not, can be fashioned according to the present invention.

According to the method aspect of the present invention, a method is provided of making a filament wound composite material leaf spring of the invention, as described above. The method of the invention comprises providing a winding mandrel having a convex winding surface with radius of curvature $R_C$. This radius of curvature of the winding mandrel corresponds to the camber of the finished leaf spring and is not necessarily constant over the length of the winding surface. Obviously, the winding surface will be at least as long as the leaf spring to be formed. According to one most preferred embodiment of the invention, the winding mandrel is approximately wheel shaped and is rotatably mounted on an axle. The rim of the wheel forms an endless winding surface and multiple leaf springs, for example, three leaf springs, can be formed end-to-end simultaneously around the wheel. Of course, the mandrel will generally not have a perfectly annular winding surface but rather will have a radius of curvature which varies to yield the camber desired for the leaf springs to be formed around the mandrel. Thus, the winding surface of the mandrel typically would provide substantially flat portions where the leaf springs to be formed require axle attachment portions. The number of leaf springs which can be fit around the surface of the winding mandrel will, obviously, depend upon the size of the winding mandrel and the size and shape of the leaf springs to be formed thereon.

The winding mandrel provides a trough or channel formed by the winding surface and side walls extending radially from the winding surface. The width of the channel formed by the side walls will determine the width of the leaf spring. Thus, to form a leaf spring according to the present invention as described above, the channel will have a first portion of substantially uniform width $W_A$ less than the maximum width $W_M$ of the channel. This first portion of the channel would be of length $L_M$, typically about $(0-0.2)L_M$. A second portion of the channel following substantially immediately the first portion would correspond to the intermediate portion of the leaf spring. Hence, it would have length $L_I$ about $(0.1-0.5)L_M$ and width $W_I$ which increases continuously from $W_A$ to $W_M$ over length $L_I$.

A third portion of the winding trough follows the second portion. Such third portion is of constant width $W_M$ and length $L_W$ about $(0-0.3)L_M$.

A fourth portion of the winding channel following substantially immediately the third portion, if any, or directly the second portion, corresponds to the end portion of the leaf spring comprising segment C of the preferred leaf spring illustrated in the drawings. Thus, this portion of the trough will have length $L_E$ about $(0.0-0.2)L_M$ and width $W_E$ which decreases continuously over length $L_E$ from $W_M$ to less than $W_M$.

If the winding channel is to widen in the second portions thereof, then the side walls must curve laterally outward from the axial center line of the winding path. In accordance with the foregoing discussion, it will be understood that to provide the leaf spring of the present invention the side walls will have lateral outwardly convex curvature of radius $R_I$ (or $R_E$) which radius at each point is substantially equal to $R_C$ at the point. That is, the radius of the lateral curvature of the side walls will be substantially equal to the radius $R_C$ of the longitudinal curvature of the leaf spring at each point within the aforesaid second and fourth portions of the winding channel.

As noted above, the winding mandrel according to a preferred embodiment of the invention is substantially wheel shaped and provides an endless trough. The leaf springs are formed end-to-end in the trough such that the beginning of one leaf spring is integral with and extends longitudinally from the end of the next leaf spring. Cutting through each junction between one leaf spring and the next allows the individual leaf springs to be removed for subsequent processing.

In addition to providing a winding mandrel as just described, the method of the present invention further comprises providing an array of continuous filaments adapted to be wound onto the winding surface of the mandrel. Such array of filaments can be impregnated with resin according to methods well known to the skilled of the art. Typically, filaments such as glass roving, yarn or the like are drawn from one or more spools or other source. The filaments are drawn through a resin bath comprising any of numerous commercially available resins well known to the skilled of the art including, for example, thermoplastic or, more typically, thermosetting resins such as epoxy or polyester resins. The array of resin-impregnated filaments are wound under tension, typically for example about 20 lbs, tension, into the winding channel of the mandrel.

FIG. 5 illustrates a filament wound leaf spring according to another preferred embodiment of the invention. The leaf spring of FIG. 5 is adapted for use in a suspension system and, more particularly, can be used in the suspension system of a motor vehicle. The leaf spring has a longitudinal upper surface 20 and a longitudinal lower surface, not shown, of substantially equal length. The leaf spring has right and left longitudinal side surfaces (not shown). As stated above, the overall length, that is, the longitudinal dimension of the leaf spring, is defined to be $L_M$ and the width, that is, the lateral dimension of the upper surface 20 and lower surface (not shown) at the widest point, is defined to be $W_M$. The leaf spring comprises a central portion having length defined to be $L_A$. Preferably length $L_A$ is about $(0-0.4) L_M$ and, typically, is about $0.1L_M$. This central portion has substantially uniform width $W_A$ which is less than $W_M$. The central portion preferably has substantially no camber. The leaf spring further comprises an intermediate portion extending longitudinally (to the right in FIG. 5) from the aforesaid central portion. The intermediate portion has length $L_I$ which preferably is about $(0.1-0.5) L_M$ and width $W_I$ which increases continuously over its length $L_I$ from the width of the central portion, that is, width $W_A$, to the maximum width of the leaf spring, that is, $W_M$. The width increases with distance from the center of the leaf spring.

The leaf spring has a certain degree of camber as discussed above in connection with the leaf spring of FIGS. 1, 2 and 3. More specifically, the leaf spring has longitudinal camber of radius $R_C$ (not shown), $R_C$ not necessarily being constant over the length of the leaf spring.

As discussed above in connection with the leaf spring of FIGS. 1, 2 and 3, it is a characterizing aspect of the present invention that the right and left lateral surfaces of the aforesaid intermediate portion flair outwardly, that is, each has lateral outward curvature of radius $R_I$, wherein $R_I$ is at each point along $L_I$ Substantially equal to $R_C$ at that point. That is, the leaf spring becomes wider along length $L_I$ by lateral outwardly convex curvature of the longitudinal side surfaces and the radius of curvature thereof is substantially equal to the radius $R_C$ of the camber of the leaf spring at each point along $L_I$. This aspect of the invention is discussed in greater detail above in connection with the leaf spring of FIGS. 1, 2 and 3.

A third portion of the leaf spring of FIG. 5 is a constant width portion. That is, along length $L_W$ the leaf spring has constant width $W_M$.

A fourth portion of the leaf spring comprises two segments. The first segment is integral with and extends longitudinally (to the right in FIG. 5) from the aforesaid constant-width portion. The final segment is adapted to carry an attachment eye, whereby the leaf spring can be attached, for example, to a motor vehicle chassis. Such portion is seen to extend longitudinally (to the right in FIG. 5) from the aforesaid portion of length $L_E$. Preferably length $L_E$ is about (0–0.2) $L_M$. The width $W_E$ of the fourth portion decreases continuously over length $L_E$ from a width equal to $W_M$ to a lesser width. As discussed above in connection with the leaf spring of FIGS. 1, 2 and 3, the rate at which the width of this portion decreases must follow the same limitation as the rate at which the width of the widening portion increases. That is, the lateral side surfaces of the leaf spring in this portion, wherein the leaf spring become more narrow, each follows an outwardly convex curve on radius $R_E$, where $R_E$ at each point is equal or approximately equal to the camber, that is, to the longitudinal radius of curvature $R_C$ at that point along the spring. While only the right half of the leaf spring of FIG. 5 has been described above in detail, it will be apparent to the skilled of the art that the left-hand side of the leaf spring (as seen in FIG. 5) is substantially symmetrical to the right-hand side. Thus, a left side intermediate section extends from the central constant-width section for a length $L'_I$ and has a width $W'_I$ increasing from $W_A$ to the maximum width of the left-hand portion of the spring, $W'_M$. The longitudinal side surfaces of the leaf spring along this left-hand intermediate portion each follows a curve of radius $R'_I$ which, at each point along $L'_I$, is equal to the longitudinal radius of curvature $R_C$ at that point along the spring. A constant-width section extends longitudinally (to the left in FIG. 5) from the aforesaid left side intermediate portion. It has length $L'_W$ and width $W'_M$. Extending longitudinally (to the left in FIG. 5) from the section of constant-width $W'_M$ is a section of length $L'_E$ and width $W'_E$, which width decreases continuously from $W'_M$ to a lesser width. For reasons already discussed, the lateral side surfaces of this portion of the leaf spring each follows an outwardly convex curve of radius $R'_E$ which at each point is equal or approximately equal to the camber, that is, to the longitudinal radius of curvature $R_C$ at that point along the spring. Finally, a constant width section extending (to the left in FIG. 5) from the aforesaid section of length $L'_E$ is adapted to receive an attachment eye.

FIG. 6 illustrates a leaf spring 40 according to the present invention equipped with an attachment eye 50, whereby the leaf spring can be attached, for example, to a motor vehicle chasis. Attachment eye 50 includes hardware 60 intermediate the leaf spring and the attachment eye.

While the invention has been shown and described in its preferred embodiment, it will be clear to those skilled in the art that changes and modifications can be made thereto consistant with the principles disclosed above, without departing from the scope of the invention.

INDUSTRIAL APPLICABILITY

It will be obvious from the foregoing that this invention has industrial applicability to provide leaf springs for suspension systems such as, for example, automotive vehicle suspension systems. In particular, the invention provides a filament wound leaf spring of optimal spring efficiency, that is of optimal energy storage capability per unit mass. The filament wound leaf spring of the invention had industrial applicability to suspension systems other than for motor vehicles, for example, for stationery machines and devices, and further has industrial applicability to uses such as will be apparent in view of the present disclosure to those skilled in various related arts.

I claim:

1. A method of making a filament wound composite material leaf spring having upper and lower surfaces of length $L_M$ and of width $W_M$ at the widest point, and having longitudinal portions in which the width of the leaf spring changes substantially, and having longitudinal camber such that said upper and lower surfaces each has a longitudinal radius of curvature $R_C$, where $R_C$ is not necessarily constant over length $L_M$, and said leaf spring having a right and a left longitudinal side surface and a substantially constant total cross-sectional area, which method comprises:

A. providing a winding mandrel having a convex winding surface with longitudinal radius of curvature $R_C$, and having longitudinal side walls extending from said winding surface to form therewith a winding trough of length at least $L_M$, said winding trough having longitudinal portions in which its lateral width changes substantially, a first portion of said trough having length $L_A$ about (0–0.4)$L_M$ and substantially uniform width $W_A$ less than $W_M$; a second portion having length $L_I$ about (0.1–0.5)$L_M$ following said first portion of said trough, having width $W_I$ which increases continuously over length $L_I$ from $W_A$ adjacent said first portion to $W_M$; and a third portion following said second portion and having length $L_W$ about (0–0.3)$L_M$ and substantially constant width $W_M$; and a fourth portion following said third portion and having length $L_E$ about (0–0.2)$L_M$ and width $W_E$ which decreases continuously over length $L_E$ from $W_M$ adjacent said second portion to less than $W_M$;

said winding trough characterized in that said longitudinal side walls, in said portions of the winding trough wherein the width of the winding trough changes substantially, are outwardly convex and define a curve, the radius of which curve at each point is substantially equal to said longitudinal radius of curvature, $R_C$, of the winding surface at that point;

B. providing an array of continuous filaments adapted to be wound into said trough;

C. impregnating said array of filaments with thermosetting or thermoplastic liquid resin; and D. laying said array of resin-impregnated filaments under tension into said trough in a direction from said first portion to said second portion to said third portion.

2. The method according to claim 1 adapted to produce simultaneously more than one said leaf spring, wherein said annular trough defines a series of sets of said portions, wherein each said set defines a leaf spring.

3. The method of claim 1 wherein said resin consists essentially of thermosetting resin and said continuous filaments comprise glass roving.

* * * * *